(12) United States Patent
Oliver Vargas et al.

(10) Patent No.: US 9,713,859 B2
(45) Date of Patent: Jul. 25, 2017

(54) FILLER MESH FOR LASER CLADDING

(71) Applicant: Siemens Energy, Inc., Orlando, FL (US)

(72) Inventors: Ivan F. Oliver Vargas, Houston, TX (US); Ahmed Kamel, Orlando, FL (US); Gerald J. Bruck, Oviedo, FL (US); Atul L. Navale, Houston, TX (US)

(73) Assignee: SIEMENS ENERGY, INC., Orlando, FL (US)

(*) Notice: Subject to any disclaimer, the term of this patent is extended or adjusted under 35 U.S.C. 154(b) by 274 days.

(21) Appl. No.: 14/508,186

(22) Filed: Oct. 7, 2014

(65) Prior Publication Data

US 2016/0096235 A1    Apr. 7, 2016

(51) Int. Cl.

| | |
|---|---|
| *B32B 3/24* | (2006.01) |
| *B23K 26/57* | (2014.01) |
| *C23C 4/02* | (2006.01) |
| *C23C 4/18* | (2006.01) |
| *C23C 28/00* | (2006.01) |
| *C23C 4/11* | (2016.01) |
| *C23C 4/073* | (2016.01) |
| *B23K 101/00* | (2006.01) |

(52) U.S. Cl.
CPC .............. *B23K 26/57* (2015.10); *C23C 4/02* (2013.01); *C23C 4/073* (2016.01); *C23C 4/11* (2016.01); *C23C 4/18* (2013.01); *C23C 28/3215* (2013.01); *C23C 28/3455* (2013.01); *B23K 2201/001* (2013.01); *Y10T 428/24331* (2015.01)

(58) Field of Classification Search
CPC ..................... B23K 26/57; Y10T 428/24331
See application file for complete search history.

(56) References Cited

U.S. PATENT DOCUMENTS

| | | | | |
|---|---|---|---|---|
| 5,484,980 | A * | 1/1996 | Pratt | B23K 26/08 219/121.65 |
| 6,444,331 | B2 * | 9/2002 | Ritter | 428/553 |
| 2009/0324841 | A1 | 12/2009 | Arrell et al. | |
| 2010/0237134 | A1 | 9/2010 | Bucci et al. | |
| 2013/0177440 | A1 | 7/2013 | Zhang et al. | |
| 2013/0210299 | A1 * | 8/2013 | Zhang | D03D 9/00 442/6 |

* cited by examiner

*Primary Examiner* — William P Watkins, III

(57) ABSTRACT

A coating arrangement (16), including: a layer (18) of bond coat material (20); and a light-transmissive thermal barrier coating (TBC) mesh (28) having a TBC material (24) and secured in position relative to the layer of bond coat material. The coating arrangement may be positioned over a superalloy substrate material (12) and melted with a laser beam (62) to metallurgically bond the thermal barrier coating onto the substrate.

20 Claims, 1 Drawing Sheet

FILLER MESH FOR LASER CLADDING

FIELD OF THE INVENTION

This invention relates generally to coating high-temperature superalloy components by heating an applied flexible mesh with an energy beam.

BACKGROUND OF THE INVENTION

Certain gas turbine engine components are exposed to temperatures that necessitate a protective coating arrangement. This coating arrangement may include a bond coat layer of, for example, an MCrAlY material, and a thermal barrier coating layer of, for example, yttria-stabilized zirconia. These coatings may be applied to a superalloy substrate during original manufacture, or an engine run component that has experienced spallation.

Application of these coating layers may be accomplished using several known processes, including thermal spraying processes such as Low Pressure Plasma Spray and High Velocity Oxygen Fuel processes. The coating layers must be applied so they maintain a certain level of roughness, uniformity of thickness, or even a specified gradient, any of which can be difficult to efficiently achieve using the known processes. Consequently, there remains room in the art for improvement.

BRIEF DESCRIPTION OF THE DRAWINGS

The invention is explained in the following description in view of the drawings that show.

DETAILED DESCRIPTION OF THE INVENTION

Figure 1:
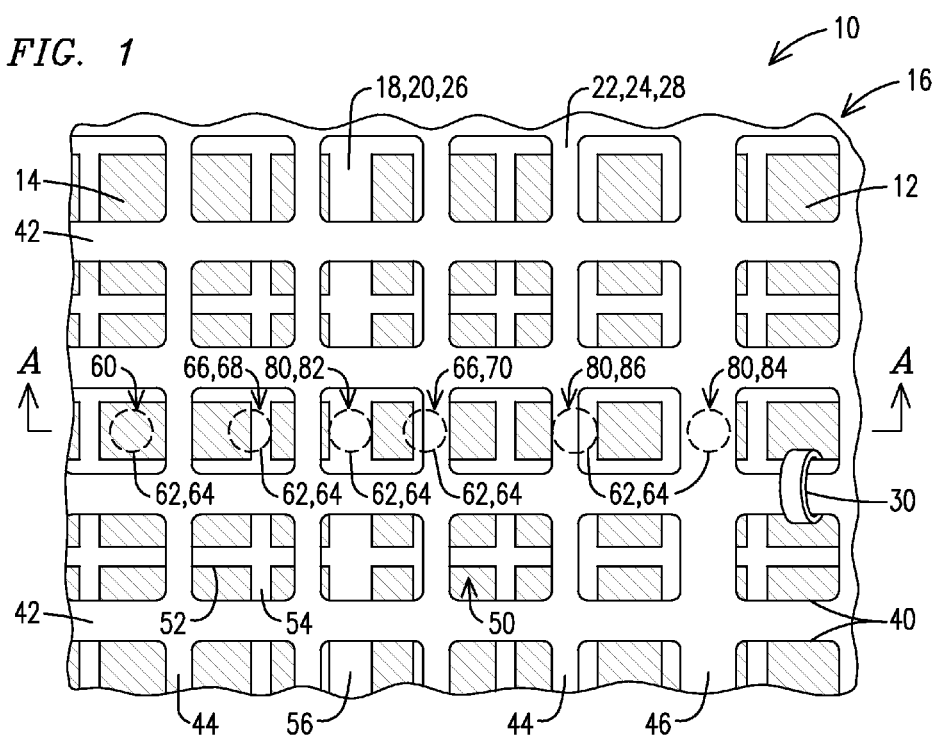
FIG. 1 is a top view of a thermal barrier coating mesh overlying a bond coat mesh overlying a substrate.

The present inventors have devised a unique assembly and method for applying a coating arrangement including a bond coat and/or a thermal barrier coating (TBC) to a substrate. The bond coat material may be, for example, an MCrAlY material, the TBC material may be, for example, yttria-stabilized zirconia, and the substrate material may be, for example, a superalloy. However, other bond coat, TBC, and substrate materials may be used as are known to those in the art. The bond coat material may be embodied as a light transmissive mesh that can be applied to the substrate. As used herein, light transmissive means that in at least one region light can travel unobstructed through the mesh. Light includes, for example, an energy beam such as a laser beam.

The bond coat mesh may be pre-shaped such that its contour matches a local contour of the substrate where the mesh is applied, and/or the bond coat mesh may be flexible such that it can be formed to the local contour of the substrate. Forming may occur, for example, as the bond coat mesh is applied to the substrate. Likewise, the TBC material may be embodied as a light transmissive TBC mesh that can be applied to the substrate and/or to the bond coat mesh. The TBC mesh may be pre-shaped such that its contour matches a local contour of the substrate or the BC mesh, and/or the TBC mesh may be flexible such that it can be formed to the local contour of the substrate and/or the bond coat mesh. Additional examples of acceptable TBC mesh include pure alumina, pure silica, 3M™ Nextel™ Woven Fabric 440 (composition—70% alumina-28% silica 2% boria) and 3M™ Nextel™ Woven Fabric 610 (composition>99% alumina) and 3M™ Nextel™ Woven Fabric 720 (composition 85% alumina-15% silica).

Alternately, a light transmissive coating arrangement including the bond coat mesh and the TBC mesh may be formed. The coating arrangement may be pre-shaped such that its contour matches a local contour of the substrate where the coating arrangement is applied, and/or the coating arrangement may be flexible such that it can be formed to the local contour of the substrate. The bond coat mesh and the TBC mesh may be held in a predetermined positional relationship with each other and each mesh may have a similar or a different pattern. Such a positional relationship can be achieved by mechanically joining two meshes via stitching, fasteners, adhesive (e.g. sizing, cement), and bonding etc. The positional relationship may take advantage of the respective patterns to form a coating arrangement pattern that includes a variety of regions within the coating arrangement including fully light transmissive to light blocking. Within the light-blocking regions, one or both layers may block light from passing through the coating arrangement. Stated another way, one or both layers may be disposed in a path of light emanating from a light source. For example, either or both meshes may be disposed between a source of an energy beam and the substrate. In the case of an energy beam having a known cross section, the coating arrangement may include partially light blocking regions where some of the energy beam may pass through the coating arrangement unobstructed, while a portion of the beam may be blocked by the bond coat mesh and/or the TBC mesh.

Once placed on the substrate and the substrate and the mesh or coating arrangement pattern is registered with an energy beam controller, the energy beam may be selectively directed through the mesh and/or onto one or both mesh layers to selectively heat the substrate, the bond coat mesh, and/or the TBC mesh to melt and/or sinter the respective material. Once cooled, a metallurgically bonded component is formed including a substrate and at least one of the bond coat layer and the TBC layer.

While a substrate, a bond coat mesh, and a TBC mesh are discussed herein, the bond coat may include one or more layers of bond coat material. Likewise, the TBC may include several layers of TBC material. Some, all, or none of the bond coat layers may be embodied as a mesh. If not embodied as a mesh, the bond coat layers may be embodied as, for example, a foil etc. The coating arrangement may include other materials, including flux, which may be in separate layers or incorporated into at least one of the bond coat layers and/or the TBC layers.

FIG. 1 schematically represents an assembly 10 including a substrate 12 having a substrate surface 14, and a coating arrangement 16 including a bond coat layer 18 made of bond coat material 20 and a TBC layer 22 made of TBC material 24. The bond coat material 20 is embodied as a bond coat mesh 26 and the TBC material 24 is embodied as a TBC mesh 28. The bond coat mesh 26 and the TBC mesh 28 may be secured to each other via one or more fasteners 30. The fastener 30 may be a material that is compatible with at least one of the bond coat material 20 and the TBC material 24, such that once processed the resulting bond coat and TBC maintain uniform characteristics. To accomplish this the fastener 30 may be made of the same or similar material as the bond coat material 20 or the TBC material 24. There may be any number of fasteners 30, and they may be arranged in any pattern, in any orientation, and with any frequency and position desired. The coating arrangement 16 may have any number of bond coat layers 18, and/or any number of TBC layers as well as any other layers deemed beneficial, such as a flux layer (not shown).

The TBC mesh 28 shown in FIG. 1 is characterized by a fairly consistent TBC mesh pattern having TBC mesh openings 40 of consistent size and shape defined by horizontal TBC bands 42 and vertical TBC bands 44 of TBC material 24. While the TBC mesh 28 resembles a grid, any shape that passes light unobstructed through can be used. For example, the TBC mesh may resemble a honeycomb shape, or the TBC mesh openings 40 may be diamond or circular or rectangular etc. In addition, the TBC mesh 28 may be more or less uniform than shown, and the TBC mesh pattern may vary throughout its area. For example, a relatively wide vertical TBC band 46 is included in FIG. 1.

In contrast, the bond coat mesh 26 shown in FIG. 1 is characterized by a relatively less consistent bond coat mesh pattern than characterizes the TBC mesh pattern. The bond coat mesh pattern includes bond coat mesh openings 50 and horizontal bond coat bands 52 and vertical bond coat bands 54 of bond coat material. While the bond coat mesh 26 resembles a grid, any shape that passes light unobstructed through can be used. In addition, the bond coat mesh 26 may be more or less uniform than shown, and the bond coat pattern may vary throughout its area. For example, a relatively wide vertical bond coat band 56 is included in FIG. 1.

Together the TBC mesh pattern and the bond coat mesh patterns form a coating arrangement pattern seen in FIG. 1. The coating arrangement pattern may be selected to create different regions, including a fully transmissive region, a partly obstructed region, and a fully obstructed region. A fully transmissive region 60 passes an energy beam 62 of known cross section 64 through the coating arrangement 16 completely unobstructed so that the energy beam 62 reaches the substrate surface 14.

A partly obstructed region 66 passes part of an energy beam 62 to the substrate surface 14 and obstructs part of the energy beam 62 with at least one of the bond coat bands 52, 54, and the TBC bands 42, 44. Stated more generally, at least one of bond coat mesh 26 and the TBC mesh 28 blocks part of the energy beam 62. When only the bond coat mesh blocks part of the energy beam 62, such as in a first partly obstructed region 68, then energy from the energy beam 62 reaches the substrate surface 14 and the bond coat mesh 26 simultaneously. When both the bond coat mesh 26 and the TBC mesh 28 block part of the energy beam 62, such as in a second partly obstructed region 70, then energy from the energy beam 62 reaches the substrate surface 14, the bond coat mesh 26, and the TBC mesh 28 simultaneously. While FIG. 1 depicts an entire width of a band blocking the energy beam 62, less than an entire width of a given band may be used to block the energy beam 62.

A fully obstructed region 80 obstructs the entire cross section 64 of the energy beam 62 with at least one of the bond coat bands 52, 54, or the TBC bands 42, 44. Stated more generally, at least one of bond coat mesh 26 and the TBC mesh 28 blocks part of the energy beam 62. In a first fully obstructed region 82 the bond coat mesh 26 blocks the entire cross section 64 of the energy beam 62. In a second fully obstructed region 84 the TBC mesh 28 blocks the entire cross section 64 of the energy beam 62. In a third fully obstructed region 86 the bond coat mesh 26 and the TBC mesh 28 block the energy beam 62.

While FIG. 1 depicts an entire width of a band blocking the energy beam 62, less than an entire width of a given band may be used to block the energy beam 62. For example, the relatively wide vertical TBC band 46 and/or the relatively wide vertical bond coat band 56 may be wider than a beam diameter. This may apply to any band, not just those that are relatively wide.

While the two meshes are shown with their bands being aligned, the TBC mesh 28 and the bond coat mesh 26 may be rotated clockwise or counterclockwise from each other (in the view of FIG. 1) any amount so that the respective bands form any angle with each other. Any bond coat mesh pattern may be used in conjunction with any TBC mesh pattern to form any coating arrangement pattern.

While FIG. 1 depicts both the bond coat mesh 26 and the TBC mesh 28 associated with the substrate 12, the bond coat mesh 26 only or the TBC mesh 28 only may be associated with the substrate 12. For example, the bond coat mesh 26 may be associated with the substrate 12 for metallurgical bonding there to. Then the TBC mesh 28 may subsequently be associated with bond coat mesh 26 that has already been metallurgically bonded to the substrate 12. Likewise, the TBC mesh 28 may be directly associated with the substrate 12 for metallurgical bonding there to, without any bond coat.

Either or both the bond coat mesh 26 and the TBC mesh may be flexible and as such they may be made to conform to a contour when applied. The bond coat mesh 26 may include bond coat material and another material deemed desirable, or it may solely consist of bond coat material such as an MCrAlY. Likewise, the TBC mesh may include TBC material and another material deemed desirable, or it may solely consist of the TBC material such as yttria stabilized zirconia.

Figure 2:
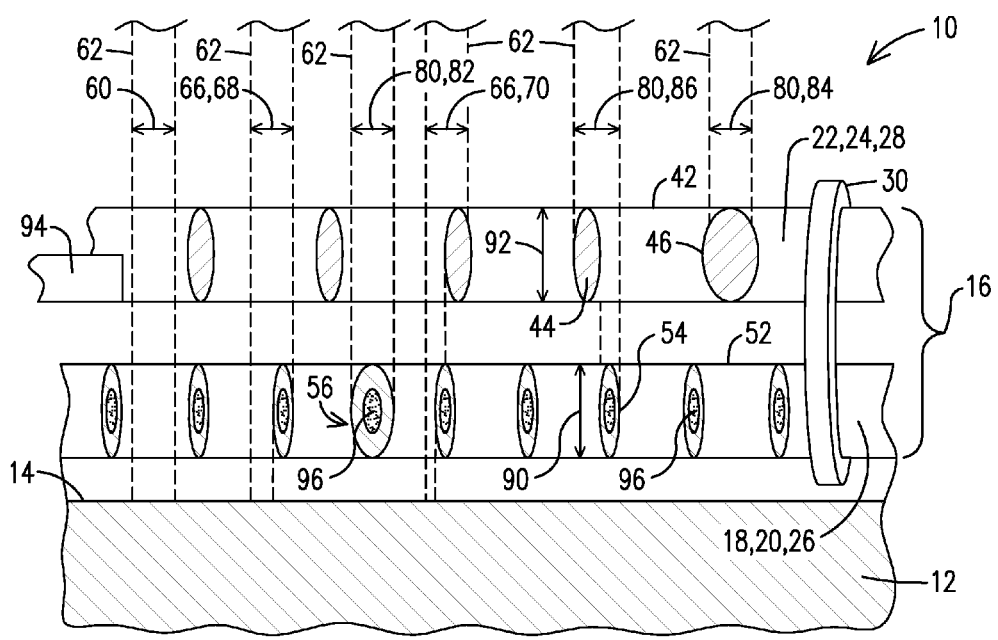
FIG. 2 is a view along A-A of FIG. 1.

FIG. 2 is a side cross section along A-A of FIG. 1. It can be seen how the entire energy beam 62 reaches the substrate surface 14 in the fully transmissive region 60, how a portion of the energy beam 62 reaches the substrate surface 14 in the partly obstructed regions 66, and none of the energy beam 62 reaches the substrate surface 14 in the fully obstructed regions 80. The coating arrangement pattern may include any combination of the fully transmissive regions 60, the partly obstructed region 66, and the fully obstructed regions 80, in any distribution. Further, the coating arrangement 16 may include varying numbers of layers, and/or any or all of the layers may vary in thickness to achieve a desired overall thickness and/or gradient.

The bond coat mesh 26 may be characterized by a bond coat mesh thickness 90. The bond coat mesh openings 50 and the bond coat mesh thickness 90 may be coordinated such that when processed by the energy beam 62 and metallurgically bonded to the substrate 12 the bonded bond coat retains a desired roughness suitable for increasing adherence of processed TBC. Exemplary roughness could include height to depth variations of the order of a fraction of a millimeter. In the case of a mesh such as in FIGS. 1 and 2, the bonded bond coat may be characterized by peaks where the horizontal bond coat bands 52 and the vertical bond coat bands 54 intersect, and low points where there are bond coat mesh openings 50. The taller and more open the mesh, and accordingly more disparate energy delivery, the rougher the finish. Alternately, the shorter and tighter the mesh, the smoother the finish. An example bond coat mesh 26 of smoother finish may be height to depth variations of the order of one tenth or less millimeters. The TBC mesh may likewise be characterized by a TBC mesh height 92 that may correspond to a desired thickness for the TBC once processed by the energy beam 62. An example TBC mesh 28 may be at or more than 50 microns height to depth distance. A coating tab 94 may be incorporated into one or both of the meshes or into the assembly of meshes to confirm the thickness once processed.

The variety of ways the bond coat material 20 and the TBC material 24 may be distributed, together with the variety of ways the energy from the energy beam 62 can be distributed among the bond coat layer 18 and/or the TBC layer 22 and the substrate 12, provide great freedom in the manufacture and/or repair of a metallurgically bonded component. The energy beam 62 may be used to melt the substrate surface 14 of the substrate 12, to melt the bond coat mesh 26, and to melt or sinter the TBC mesh 28. These steps can occur sequentially, simultaneously, or in a hybrid combination of sequential and simultaneous operations.

In a sequential operation the energy beam 62 may be directed through the fully transmissive region 60 to preheat and/or melt the substrate surface 14. Then the energy beam may be directed onto the first fully obstructed region 82 to melt the bond coat mesh 26. The melted substrate may or may not be allowed to solidify before the bond coat mesh 26 is melted. Then the energy beam 62 may be directed onto the second fully obstructed region 84 to sinter and/or melt the TBC mesh. The melted bond coat material 20 may or may not be allowed to solidify before the TBC mesh is processed. Once the processed TBC material 24 is bonded the process is complete and a component having a metallurgically bonded bond coat and a metallurgically bonded TBC results. Alternately, the bond coat mesh 26 may be sequentially bonded to the substrate 12, and the TBC mesh may be subsequently applied and bonded.

In a simultaneous operation the energy beam 62 may be directed onto the second partly obstructed region 70 which results in the energy beam 62 reaching the substrate 12, the bond coat mesh 26, and the TBC mesh 28 simultaneously. In this case all three would melt simultaneously and then be allowed to cool. The resulting melt would include substrate material, bond coat material 20, and TBC material 24. The three materials would need to maintain their respective locations such that once solidified the TBC overlies the bond coat which overlies the processed part of the substrate. It is believed that the substrate material and the bond coat material 20 would remain under the relatively more buoyant TBC material 24, thereby making this process viable.

In a hybrid operation the energy beam 62 may process one layer during one operation and two layers during a different operation. For example, in a first hybrid operation, the energy beam 62 may be directed onto the first partly obstructed region 68 to simultaneously melt the substrate surface 14 and the bond coat mesh 26. The energy beam 62 may then be directed onto the second fully obstructed region 84 to melt or sinter the TBC mesh 28. The melted substrate and the melted bond coat material 20 may or may not be allowed to solidify before processing the TBC mesh 28.

In a second hybrid operation the energy beam 62 may be directed through the fully transmissive region 60 to preheat and/or melt the substrate surface 14. The energy beam 62 may then be directed onto the third fully obstructed region 86 to melt the bond coat mesh 26 and the TBC mesh 28 simultaneously. The substrate material may or may not be allowed to solidify before the energy beam 62 is directed onto the third fully obstructed region 86. The melt resulting from the second processing by the energy beam would include melted bond coat material 20 and melted TBC material 24. The relatively more buoyant TBC material 24 should remain above the bond coat material 20, thus preserving the desired final configuration where the TBC material 24 overlies the bond coat material 20 that overlies the melted substrate material.

The above operations may be performed exclusively during the bonding process, or sequential, simultaneous, and hybrid operations may be intermixed as desired to achieve the desired bonding and finished component.

Further, adhesion of the TBC material 24 to the bond coat material 20 may be accomplished together with diffusion of the bond coat material 20 into the substrate 12, or these processes may occur separately. For example, if diffusion of the bond coat material 20 into the substrate 12 is to be performed separately from adhering the TBC material 24 to the bond coat material 20, the energy beam 62 may be directed simultaneously onto any combination of the fully transmissive regions 60, the partly obstructed region 66, and the fully obstructed regions 80, in any distribution to melt the substrate surface 14 and the bond coat mesh 26. The energy beam 62 parameters may then be modified and directed onto an upper surface of a resulting molten pool of bond coat material 20 (and molten substrate) for a specified amount of time to allow for diffusion of the bond coat material 20 into the substrate 12. The melted substrate and the melted bond coat material 20 may or may not be allowed to solidify before attaching and processing the TBC mesh 28 or, if the TBC mesh 28 is already applied, before processing the attached TBC mesh 28.

In an exemplary embodiment where the substrate is a superalloy, the coating arrangement 16 may include a flux 96 as described in U.S. patent publication number 2013/0140278 to Bruck et al. and incorporated in its entirety by reference herein. The flux 96 is shown incorporated into the bond coat mesh 26, but may be discrete within the coating arrangement 16. For example, the flux 96 may be a separate layer embodied as a sheet, foil, or mesh and may also be flexible. Alternately, the flux 96 may be a powder deposited onto the surface of the substrate. When in mesh form the mesh can be incorporated into the sequential, simultaneous, and hybrid processing disclosed above. When in powder form the flux 96 may be disposed on the substrate surface 14 and melted in conjunction with either or both the substrate surface 14 and the bond coat mesh 26. If the flux 96 is disposed below a material to be melted then the flux 96 should be the most buoyant so that it floats in the melt and can be removed. Positioning the flux in such a manner may aid cleaning and fluidity of the melt as it floats up through the melt. If another layer of material is to be processed after flux 96 has been processed, the flux 96 may first be removed and the other layer subsequently added and then processed.

An energy beam suitable for such a process may incorporate advanced scanning optics (e.g. Cambridge Technology Lightning II 4 kW, Scanlab powerSCAN 4 kW, Trumpf PFO 3D 8 kw and IPG 8 kW) to index the energy beam as desired. The bond coat mesh 26, the TBC mesh 28, or the bond coat mesh 26 secured to the TBC mesh 28 may be positioned on the substrate and registered in any number of ways known to those in the art with the scanning optics so that the scanning optics know where to direct the energy beam 62 to get the desired results. The energy beam 62 produced may be a laser beam having a circular cross section and a one millimeter diameter, though any size and shape is within the scope of the disclosure. The laser may be a continuous wave beam caused to jump to various locations as desired and/or a pulse laser beam that is activated as desired during its movement.

The energy present in the energy beam 62 may be adjusted to accommodate different properties of the materials being processed. For example, the heat sink effect of the substrate may necessitate more energy to melt the substrate surface 14 than would a bond coat having material with a similar melting point but less mass. The TBC material 24 may have the highest melting point and hence require the energy to be adjusted accordingly. In a simultaneous or hybrid operation the energy may be distributed by adjusting how the percentage of the beam that reaches the materials being processed. For example, when reaching both the substrate surface and the bond coat mesh 26, a larger portion of the cross section of the energy beam 62 may be directed onto the substrate surface 14 in order to accommodate the heat sink effect of the substrate 12. Likewise, when directing the energy beam onto the bond coat mesh 26 and the TBC mesh 28, a larger portion of the cross section of the energy beam 62 may be directed onto the TBC mesh 28 in order to accommodate the relatively higher melting temperature of the TBC mesh 28. Varying the distribution in these manners may be incorporated into the above disclosures in any way desirable.

From the foregoing it can be seen that the inventors have devised a unique structure and method for bonding the structure. Together these may provide a significant reduction in processing time for coating applications, particularly when trying to achieve a given coating thickness, with or without coating thickness gradients. They will also allow for a more uniform coating thickness. The use of tabs may be reduced or eliminated, and rework time should also be reduced. Consequently, the disclosure represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A coating arrangement, comprising:
a light-transmissive bond coat (BC) mesh comprising a BC material secured to
a light-transmissive thermal barrier coating (TBC) mesh comprising a TBC material via one or more fasteners, wherein the one or more fasteners secures the BC mesh directly to the TBC mesh, and is comprised of materials similar to one of the BC mesh or TBC mesh.

2. The coating arrangement of claim 1, wherein the coating arrangement comprises regions configured to permit transmission of light there through.

3. The coating arrangement of claim 2, wherein the coating arrangement comprises fully transmissive regions comprising openings configured to pass a 1 mm diameter light there through.

4. The coating arrangement of claim 1, wherein the coating arrangement comprises light blocking regions wherein only the BC mesh blocks light from passing there through.

5. The coating arrangement of claim 1, wherein the coating arrangement comprises light blocking regions wherein only the TBC mesh blocks light from passing there through.

6. The coating arrangement of claim 1, wherein the coating arrangement comprises light blocking regions wherein both the BC mesh and the TBC mesh block light from passing there through.

7. The coating arrangement of claim 1, further comprising a flux.

8. The coating arrangement of claim 7, wherein the BC mesh comprises the flux.

9. The coating arrangement of claim 1, wherein at least one of the BC mesh and the TBC mesh is flexible.

10. A method, comprising:
creating an assembly comprising a discrete light-transmissive thermal barrier coating (TBC) mesh overlying a discrete bond coat (BC) mesh overlying a substrate;
directing an energy beam toward the assembly;
heating at least one of the BC mesh and the substrate via the energy beam; and
allowing the assembly to cool to form a metallurgically bonded assembly.

11. The method of claim 10, wherein at least one of the BC mesh and the TBC mesh is a flexible mesh.

12. The method of claim 10, further comprising:
directing the energy beam onto the substrate but not onto the BC mesh or the TBC mesh;
melting a surface of the substrate; and
directing the energy beam onto the BC mesh but not onto the TBC mesh after melting the surface of the substrate and then melting the BC mesh.

13. The method of claim 12, further comprising directing the energy beam onto the TBC mesh after melting the BC mesh and then melting or sintering the TBC mesh.

14. The method of claim 10, further comprising:
directing the energy beam onto the substrate but not onto the BC mesh or the TBC mesh;
melting a surface of the substrate; and
directing the energy beam onto the BC mesh and the TBC mesh after melting the surface of the substrate; and
simultaneously melting the BC mesh and the TBC mesh.

15. The method of claim 10, further comprising:
directing the energy beam onto the substrate and onto the BC mesh but not onto the TBC mesh; and
melting a surface of the substrate and the BC mesh simultaneously.

16. The method of claim 10, further comprising directing the energy beam onto the substrate, onto the BC mesh, and onto the TBC mesh; and
melting a surface of the substrate, the BC mesh, and the TBC mesh simultaneously.

17. The method of claim 10, further comprising melting and solidifying the BC mesh in a manner that produces a surface roughness of the BC mesh above 50 microns height to depth distance.

18. The method of claim 10, further comprising:
assembling flux over at least one of the substrate, the BC mesh, and the TBC mesh; and
melting the flux while melting at least one of the substrate and the BC mesh.

19. A method, comprising:
creating an assembly comprising a discrete light-transmissive thermal barrier coating (TBC) mesh secured, via one or more fasteners, to a discrete bond coat (BC) mesh overlying a substrate;
directing an energy beam onto the substrate but not onto the BC mesh or the TBC mesh to melt a surface of the substrate;
directing the energy beam onto the BC mesh but not the TBC mesh after melting the surface of the substrate to melt the BC mesh; and
directing the energy beam onto the TBC mesh after melting the BC mesh and then melting or sintering the TBC mesh; and
allowing the assembly to cool to form a metallurgically bonded assembly.

20. The method of claim 19, wherein the step of melting the BC mesh or the TBC mesh melts the one or more fasteners, and wherein the one or more fasteners comprises materials similar to materials of one of the BC mesh or TBC mesh such that characteristics of BC and TBC are maintained after melting the one or more fasteners.

* * * * *